US012683396B2

(12) United States Patent
Morita et al.

(10) Patent No.: US 12,683,396 B2
(45) Date of Patent: Jul. 14, 2026

(54) POWER SOURCE, SUPERVISORY APPARATUS AND CONTROL SYSTEM

(71) Applicants:DENSO CORPORATION, Kariya-city (JP); DENSO TEN Limited, Kobe (JP)

(72) Inventors: Yoshinori Morita, Kariya-city (JP); Kohei Yamamoto, Kariya-city (JP); Yasunori Kozuki, Kobe (JP)

(73) Assignees: DENSO CORPORATION, Kariya (JP); DENSO TEN Limited, Kobe (JP)

( * ) Notice: Subject to any disclaimer, the term of this patent is extended or adjusted under 35 U.S.C. 154(b) by 0 days.

(21) Appl. No.: 18/659,651

(22) Filed: May 9, 2024

(65) Prior Publication Data

US 2024/0291273 A1    Aug. 29, 2024

Related U.S. Application Data

(63) Continuation of application No. PCT/JP2022/040453, filed on Oct. 28, 2022.

(30) Foreign Application Priority Data

Nov. 9, 2021    (JP) ................................. 2021-182720

(51) Int. Cl.
| *H02J 3/007* | (2026.01) |
| *H02J 3/001* | (2026.01) |
| *B60R 16/03* | (2006.01) |

(52) U.S. Cl.
CPC .............. *H02J 3/007* (2020.01); *H02J 3/001* (2020.01); *B60R 16/03* (2013.01)

(58) Field of Classification Search
CPC .... H02J 3/007; H02J 3/001; H02J 1/00; H02J 1/10; B60R 16/03; B60R 16/02; H02H 3/16; H02H 3/24
See application file for complete search history.

(56) References Cited

U.S. PATENT DOCUMENTS

| 2019/0337475 A1 | 11/2019 | Kawamura |
| 2020/0216002 A1 | 7/2020 | Mazaki et al. |
| 2022/0169193 A1 | 6/2022 | Mazaki et al. |

*Primary Examiner* — Daniel Cavallari
(74) *Attorney, Agent, or Firm* — Oliff PLC

(57) ABSTRACT

A power source supervisory apparatus is provided with a connection path that connects between a first path and a second path, an inter-path switch SW provided on the connection path, a current limiting element disposed to be in series to the inter-path switch SW on the connection path enabling a conduction from a first path side to a second path side under a current limiting state and obstructing conduction from the second path side to the first path side, a supervisory unit that supervises occurrence of a voltage drop on the first path in a state where the inter-switch is closed, and a switch operation unit that opens the inter-path switch SW when the supervisory unit determines that a voltage drop occurs on the first path.

6 Claims, 6 Drawing Sheets

POWER SOURCE, SUPERVISORY APPARATUS AND CONTROL SYSTEM

CROSS-REFERENCE OF RELATED APPLICATIONS

This application is the U.S. bypass application of International Application No. PCT/JP2022/040453 filed on Oct. 28, 2022, which designated the U.S. and claims priority to Japanese Patent Application No. 2021-182720 filed on Nov. 9, 2021, the contents of both of which are incorporated herein by reference.

BACKGROUND

Technical Field

The present disclosure relates to a power source supervisory apparatus and a control system.

Description of the Related Art

A power source system is known, which is adapted for a vehicle, for example, supplying electric power to various apparatuses on the vehicle. Also, some power source systems include a first power source and a second power source for supplying power to an electrical load. Such the power source system including the first and second power sources is utilized for supplying power to electrical loads in order to maintain their functions, even in the case where an abnormality occurs, during travelling of the vehicle, on the electrical load, such as an electric brake apparatus and an electrical steering apparatus for executing necessary functions for driving the vehicle.

SUMMARY

A first means of the present disclosure is adapted for a control system provided with a first control apparatus and a second control apparatus capable of controlling an electrical load, supplying power to the first control apparatus from a first power source via a first path and supplying power to the second control apparatus from a second power source via a second path. The first means includes: a connection path that connects between the first path and the second path; an inter-path switch provided on the connection path; a current limiting element disposed to be in series to the inter-path switch on the connection path, enabling conduction from a first path side to a second path side under a current limiting state and obstructing conduction from the second path side to the first path side; a supervisory unit that supervises a voltage drop on the first path in a state where the inter-switch is closed; and a switch operation unit that opens the inter-path switch when the supervisory unit determines that a voltage drop occurs on the first path.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

A power source system is known, which is adapted for a vehicle for example, supplying electric power to various apparatuses on the vehicle. Also, some power source systems include a first power source and a second power source for supplying power to an electrical load. Such power source systems including first and second power sources are utilized for supplying power to electrical loads in order to maintain their functions, even in the case where an abnormality occurs, during travelling of the vehicle, on the electrical load such as an electric brake apparatus and an electrical steering apparatus for executing necessary functions for driving the vehicle.

According to the above-described power source system, for example, JP-A 2019-62727 discloses an apparatus having a first system including a first load connected to a first power source and a second system including a second load connected to a second power source. According to the apparatus disclosed by JP-A 2019-62727, an inter-system switch is provided on a connection path that connects respective systems, in which the inter-system switch is switched to be opened by a control apparatus when a short-circuit occurs on one system to cause a short-circuit current to flow via a connection path. Thus, functions required for driving the vehicle are ensured by the load in the other system where no short-circuit occurs.

Further, a control apparatus may be provided in each of the first and second systems so as to accomplish redundant configuration of the control apparatus. In this case, since a control apparatus is disposed in each system, whereby a power failure in respective control apparatuses can be prevented from occurring even when a storage capacity of either one of the power sources is lowered. However, if a ground fault occurs in either system, for example, a large amount of current flows through each power source of both systems. In this case, when a voltage drop occurs in either the first system or the second system in a period from when a ground fault occurs to when the inter-system switch is opened, control of each load in the vehicle may be disturbed.

First Embodiment

Hereinafter, with reference to the drawings, embodiments will be described in which a power source supervisory apparatus according to the present is applied to a control system 100 mounted on a control system 100. The control system 100 controls travelling of the vehicle.

Figure 1:
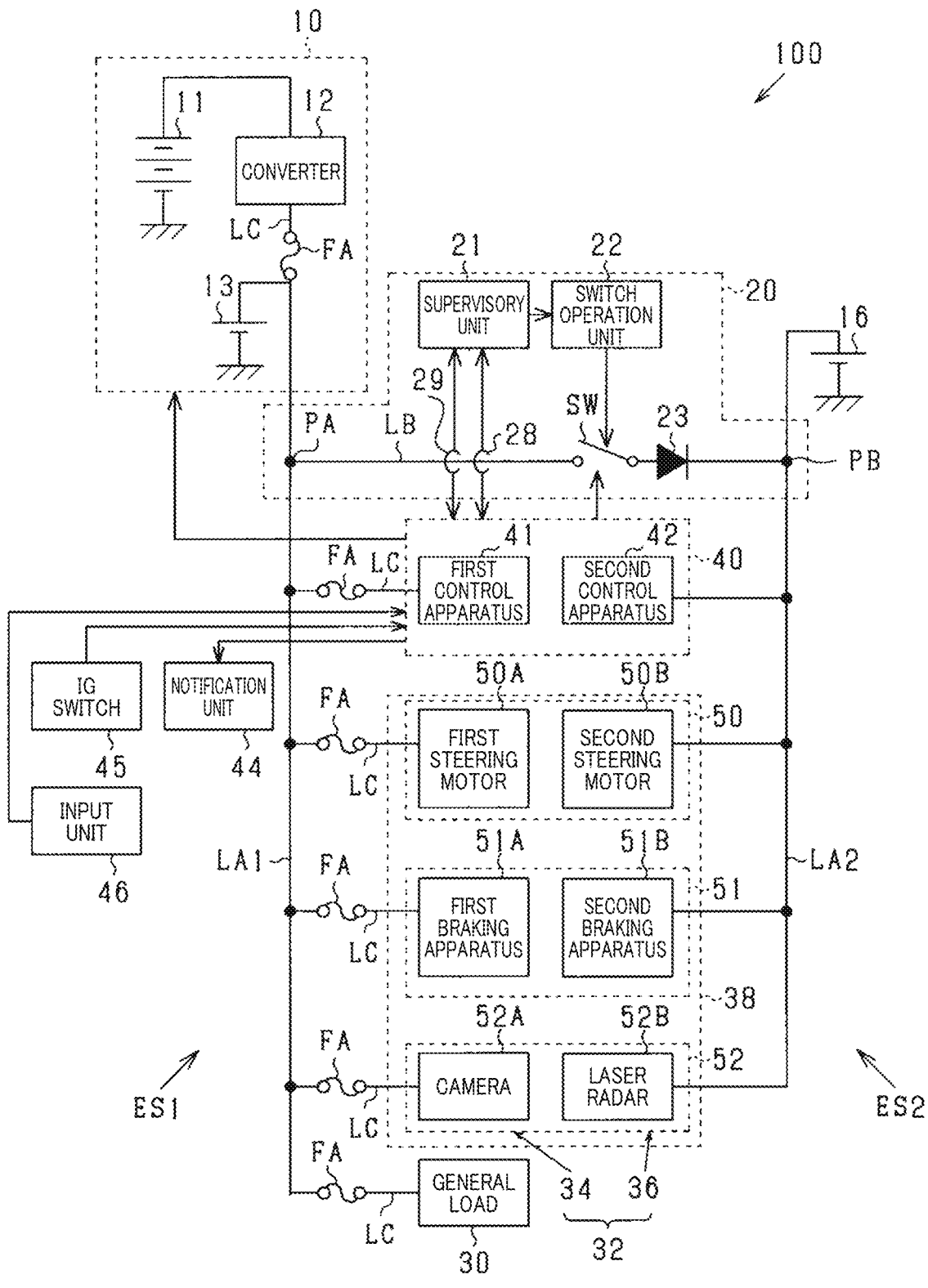
FIG. 1 is a block diagram showing an overall configuration of a control system according to a first embodiment.

As shown in FIG. 1, the control system 100 has two power source systems. In one power source system, that is, a first system ES1, a power source apparatus 10 is provided as a first power source. Also, in the other power system, that is, a second system ES2, a storage battery 16 is provided as a second power source.

The power source apparatus 10 and the storage battery 16 each serves as a power source that supplies power to a general load 30 and a specific load 32. The power source apparatus 10 is provided with a high voltage storage battery 11 and a DC-DC converter (hereinafter simply referred to as converter) 12 and a storage battery 13. Hereinafter, the storage battery 13 is referred to as a first storage battery 13, the storage battery 16 is referred to as a second storage battery 16. The high voltage storage battery 11 is a storage battery capable of outputting voltage (e.g. several hundreds of volts) higher than a rated voltage (e.g. 12V) of the first storage battery 13 and the second storage battery 16 (e.g. 12V), for example a lithium-ion battery. The converter 12 is configured as a voltage generation part that steps down a power supplied from the high voltage storage battery 11 and supplies the stepped-down voltage to the general load 30 and the specific load 32. The first storage battery 13 is, for example, lead storage battery. Further, the second storage battery 16 serves as a storage battery composed of lithium-ion storage batteries, for example.

The general load 30 is an electrical load which is not utilized for a driving operation of a vehicle (hereinafter simply referred to as load), for example, an air conditioner, an audio equipment, a power window and the like.

On the other hand, the specific load 32 serves as a load for performing at least one of functions used for driving the vehicle, for example, an electric power steering apparatus 50 that steers a vehicle, an electric brake apparatus 51 that applies a braking force to the wheels, a travel supervisory apparatus 52 that supervises state in the vicinity of the vehicle, and the like.

The specific load 32 is configured to have a redundant configuration for each function. That is, the first load 34 and the second load 36 are provided, whereby all of functions are not lost even when a fault occurs in either one of the loads 34 and 36. Specifically, the electric power steering apparatus 50 includes a first steering motor 50A and a second steering motor 50B. The electric brake apparatus 51 includes a first brake apparatus 51A and a second brake apparatus 51B. The travel supervisory apparatus 52 includes a camera 52A and a laser radar device 52B. Note that the first steering motor 50A, the first brake apparatus 51A and the camera 52A correspond to the first load 34, the second steering motor 50B, the second brake apparatus 51B and the laser radar device 52B correspond to the second load 36. According to the present embodiment, a plurality of loads included in the specific load 32 constitute a driving support apparatus 38 that performs driving support of the vehicle. According to the present embodiment, the first load 34 corresponds to a first path load.

The first load 34 and the second load 36 are provided as a redundant configuration for each function, and the first load 34 and the second load 36 cooperatively accomplish respective functions. However, each of the first and second loads 34 and 36 may individually accomplish part of the respective functions. For example, according to the electric power steering apparatus 50, with the first steering motor 50A or the second steering motor 50B, the vehicle can be steered freely. That is, each of the steering motor 50A and the steering motor 50B is able to steer the vehicle under a prescribed restriction of a steering speed and a steering range.

The ECU 40 utilizes the above-described specific load 32, thereby capable of performing a driving support control such as an adaptive cruise control (ACC) and a pre-crash safety (PCS) function. The driving support control includes a burden mitigation control such as the ACC for mitigating an operation burden of the driver, and a safety control such as the PCS for avoiding a collision between vehicles or mitigating a collision damage thereof.

The ECU 40 is capable of changing a travel mode of the vehicle between a support mode which uses a driving support control, and a normal mode which does not use the driving support control. The vehicle is able to travel in respective travel modes. The ECU 40 switches the travel mode between the support mode and the normal mode in accordance with a changing command from the driver. The support mode is utilized in automatic driving of the vehicle for example, and the normal mode is utilized in a manual driving of the vehicle for example.

The ECU 40 is connected to a notification unit 44, an IG switch 45 and an input unit 46. The notification unit 44 is configured to output a visual or audible notification to a driver. For example, the notification unit is, a display or a speaker mounted on a vehicle cabin for example. The IG switch 45 is an activation switch of the vehicle. The ECU 40 supervises an opened or closed state of the IG switch 45. The input unit 46 is configured to receive an operation of the driver. For example, the input unit 46 is a steering operation input apparatus, a shift lever operation input apparatus, an acceleration pedal operation input apparatus, a brake pedal operation input apparatus and a voice input apparatus.

The ECU 40 is provided with a first control apparatus 41 and a second control apparatus 42 as a control apparatus for performing a driving support control using the specific load 32. The respective control apparatuses 41 and 42 each includes a known microprocessor composed of CPU, ROM, RAM, Flash memory and the like. The CPU executes programs stored in the ROM to accomplish various functions. The ECU 40 is redundantly configured for controlling the specific load 32. Hence, since the ECU 40 includes the first control apparatus 41 and the second control apparatus 42, all of functions of the specific load 32 are not lost even when a fault occurs in either one of the first control apparatus 41 and the second control apparatus 42.

Specifically, in the driving support process, the first control apparatus 41 performs a first control process that calculates a control command value in the driving support control, and controls the specific load 32 using the control command value calculated by the first control process. The second control apparatus 42 performs, in parallel to the first control process, the second control process that calculates a control command value in the driving support control. In other words, the first control apparatus 41 and the second control apparatus 42 execute respective control processes of the driving support mutually in parallel. According to the present embodiment, the specific load 32 is controlled only using the control command value calculated by the first control process without using the control command value calculated by the second control process, in a normal state where no ground fault has occurred in both of the first system ES1 and the second system ES2.

Each of the first control apparatus 41 and the second control apparatus 42 is capable of individually performing the driving support control. For example, the first control apparatus 41 uses the first load 34, thereby being capable of individually performing the burden mitigation function and the safety function, and the second control apparatus 42 uses the second load 36, thereby being capable of individually performing the safety function. According to the present embodiment, the second control apparatus 42 cannot perform the burden mitigation function individually. That is, a calculation process is different between the first control process performed by the first control apparatus 41 and the second control process performed by the second control apparatus 42 such that a processing load of the second control process is smaller than a processing load of the first control process.

The first control apparatus 41 and the second control apparatus 42 are configured to be mutually communicable, having a function of mutually supervising whether a fault has occurred. The first control apparatus 41 supervises whether a fault occurs in the second control apparatus 42, and determines that a fault occurs in the second control apparatus 42 when failing to communicate with the second control apparatus 42. The second control apparatus 42 supervises whether a fault occurs in the first control apparatus 41, and determines that a fault occurs in the first control apparatus 41 when failing to communicate with the first control apparatus 41.

In the first system ES1, the power source apparatus 10 is connected to the general load 30, the first load 34 and the first control apparatus 41 via a path LA1 in the first system as a first path. According to the present embodiment, the power source apparatus 10, the general load 30, the first load 34 and the first control apparatus 41 which are connected by the path LA in the first system constitute the first system ES1.

Further, in the second system ES2, the second storage battery 16 is connected to the second load 36 and the second control apparatus 42 via a path LA2 in the second system as a second path. According to the present embodiment, the second storage battery 16, the second load 36 and the second control 42 which are connected to the path LA2 in the second system constitute the second system ES2.

The paths LA1 and LA2 in respective systems are mutually connected by the connection path LB at which an inter-path switch SW is provided. One end of the connection path LB is connected to a connection point PA in the path LA1 in the first system, and the other end of the connection path LB is connected to a connection point PB of the path LA2 in the second system. According to the present embodiment, a N-channel MOS FET (hereinafter simply referred to as MOSFET) is utilized as the inter-path switch SW.

In the connection path LB, a voltage sensor 28 that detects a voltage at the connection path PA is provided. Also, in the connection path LB, a current sensor 29 that detects a current flowing through the inter-path switch SW.

For the first system path LA1, a plurality of loads included in the first load 34, the general load 30, the first control apparatus 41 and the converter 12 included in the power source apparatus 10 via a branch path LC are each connected to the first system path LA1 via the branch path LC, and a fuse FA is provided at each branch path LC. The fuse FA is blown when excessive current flows and cut off the power to corresponding load. Note that the fuse FA is not limited to a blown-type fuse but may be a semiconductor fuse or a fuse that cut off the current when detecting excessive current.

The control system 100 includes a supervisory unit 21 and a switch operation unit 22. The supervisory unit 21 is connected to the voltage sensor 28, serving as a hardware circuit integrating a voltage determination circuit that determines whether the voltage detected by the voltage sensor 28 decreases below a predetermined threshold Vth. The switch operation unit 22 is connected between the supervisory unit 21 and the inter-path switch SW, serving as a hardware circuit integrating a voltage adjusting circuit that adjusts the voltage to be inputted to a gate terminal of the inter-path switch SW. The switch operation unit 22 adjusts the voltage to be inputted to the gate terminal of the inter-path switch SW, thereby changing the state of the inter-path switch between opened and closed.

For example, the supervisory unit 21 is configured to supervise a voltage drop at the path LA1 in the first system in a state where the inter-path switch SW is closed by the ECU 40. In the case where the supervisory unit 21 determines that a voltage drop occurs on the path LA1 in the first system, the switch operation unit 22 opens the inter-path switch SW, and electrically isolates the first system ES1 and the second system ES2. Thus, a voltage drop on the path LA1 in the first system accompanied by a voltage drop on the path LA2 in the second system can be prevented from occurring.

However, when a ground fault occurs on the path LA2 in the second system, a large amount of current flows through the inter-path switch SW from a time when the ground fault occurs to a time when the inter-path switch SW is opened. When a large amount of current causes a voltage drop on the path LA1 in the first system, due to a power loss on the path LA1 in the first system, and the path LA2 in the second system, control of the specific load 32 including a driving support control may be disturbed.

According to the present embodiment, a diode 23 is provided as a current limiting element to be in series to the inter-path switch SW on the connection path LB. The diode 23 is provided such that a direction towards the path LA2 in the second system from the path LA1 in the first system is the forward direction.

In this case, even when a ground fault at the path LA2 in the second system causes a voltage drop on the path LA2 in the second system, the diode 23 restricts current flowing from the path LA1 in the first system to the path LA2 in the second system. Hence, a voltage drop on the path LA1 in the first system is suppressed and the inter-path switch SW is opened before a power loss occurs on the path LA1 in the first system, thereby preventing control of the specific load 32 from being disturbed.

On the other hand, when a ground fault occurs on the path LA1 in the first system, even when a voltage drop occurs at the path LA1 in the first system, with the diode 23, current is prevented from flowing towards the path LA1 in the first system from the path LA2 in the second system. Hence, a voltage drop at the path LA2 in the second system can be suppressed. Thus, control of the specific load 32 can be also prevented from being disturbed. Note that a connection path LB provided between the first system ES1 and the second system ES2, the inter-path switch SW, the diode 23, the supervisory unit 21 and the switch operation unit 22 constitute a power source supervisory apparatus 20.

Figure 2:
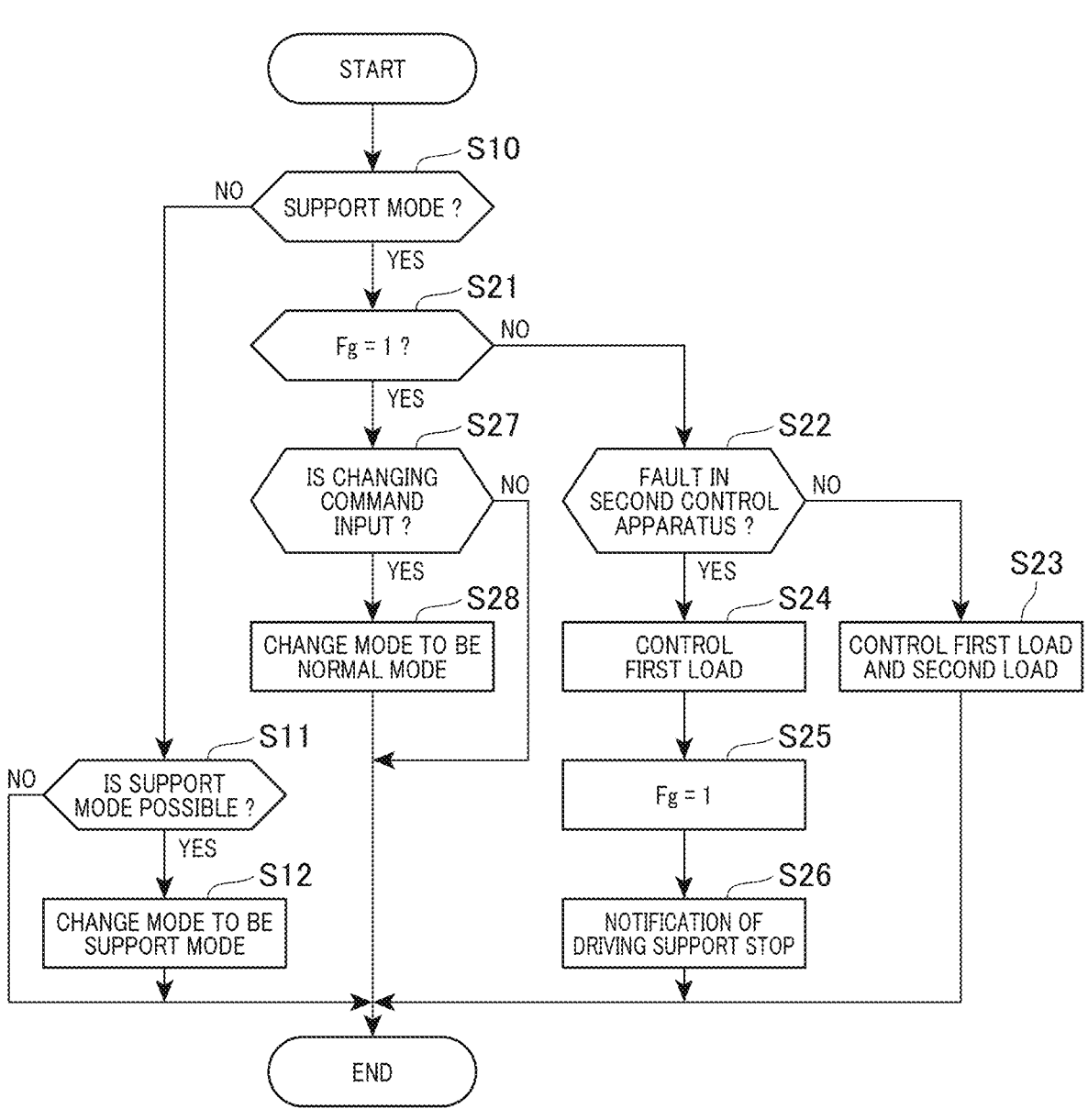
FIG. 2 is a flowchart showing a procedure of a first process.

FIG. 2 shows a flowchart of a first process performed by the first control apparatus 41. When the IG switch 45 is closed, the first control apparatus 41 repeatedly performs the first process at a predetermined period.

When the first process is activated, at step S10, the process firstly determines whether the travel mode of the vehicle is a support mode using a driving support control. When the travel mode is a normal mode which does not use driving support control, the process proceeds to step S11. When the travel mode is support mode, the process proceeds to step S21.

At step S11, the process determines whether a precondition for executing the support mode is satisfied. The precondition of the support mode is that a remaining capacity SA of the second storage battery 16 is larger than a predetermined capacity threshold Stg. Here, the remaining capacity SA refers to a state of charge (SOC) indicating a storage state of the second storage battery 16 for example, and the capacity threshold Sth refers to a capacity at which the voltage of the second storage battery 16 is higher than an operation lower limit voltage VL by a predetermined value.

In the case where the precondition for executing the support mode is not satisfied and the mode cannot be changed to a support mode, the process is temporarily terminated. In the case where the precondition for executing the support mode is satisfied and the driver inputs a changing command to the input unit 46 to change the travel mode to be a support mode, the process changes, at step S12, the travel mode of the vehicle from the normal mode to be the support mode and temporality terminates the process.

At step S21, the process determines whether an abnormality flag Fg is 1 or not. The abnormality flag Fg is set to be 0 when an abnormality has not occurred in the second control apparatus 42 and is set to be 1 when an abnormality has occurred. In the case where the abnormality flag Fg is 0, the process proceeds to step S22. In the case where the abnormality flag Fg is 1, the process proceeds to step S27.

At step S22, the process determines whether an abnormality has occurred in the second control apparatus 42. The first control apparatus 41 determines whether an abnormality has occurred in the second control apparatus 42 depending on whether a communication with the second control apparatus 42 is accomplished. When an abnormality has not occurred in the second control apparatus 42, the process determines that both the first and second loads 34 and 36 can be used. In this case, at step S23, the process performs the first control process, controls the first and second loads 34 and 36 with a control command value calculated by the first control process, and suspends the process.

On other hand, when an abnormality has occurred in the second control apparatus 42, the process determines that the second load 36 cannot be used. In this case, at step S24, the first control process is performed, which controls the first load 34 with the control command value calculated by the first control process. In other words, in the support mode, the driving support control using the first and second loads 34 and 36 is changed to be a driving support control using the first load 34 only.

At step S25, the process changes the abnormality flag Fg to be 1. At subsequent step S26, the process notifies the driver of stop of the driving support control via the notification unit 44, and temporarily terminates the process.

At step S27, the process determines whether the driver inputs the changing command to the input unit 46 for changing the travel mode to be the normal mode. That is, the process determines whether a response has been provided from the driver responding to the notification. When the driver does not input the changing command, the process suspends the process. On the other hand, when the driver inputs the changing command to the input unit 46, the process changes the travel mode of the vehicle to be the normal mode at step S28, and suspends the process.

Figure 3:
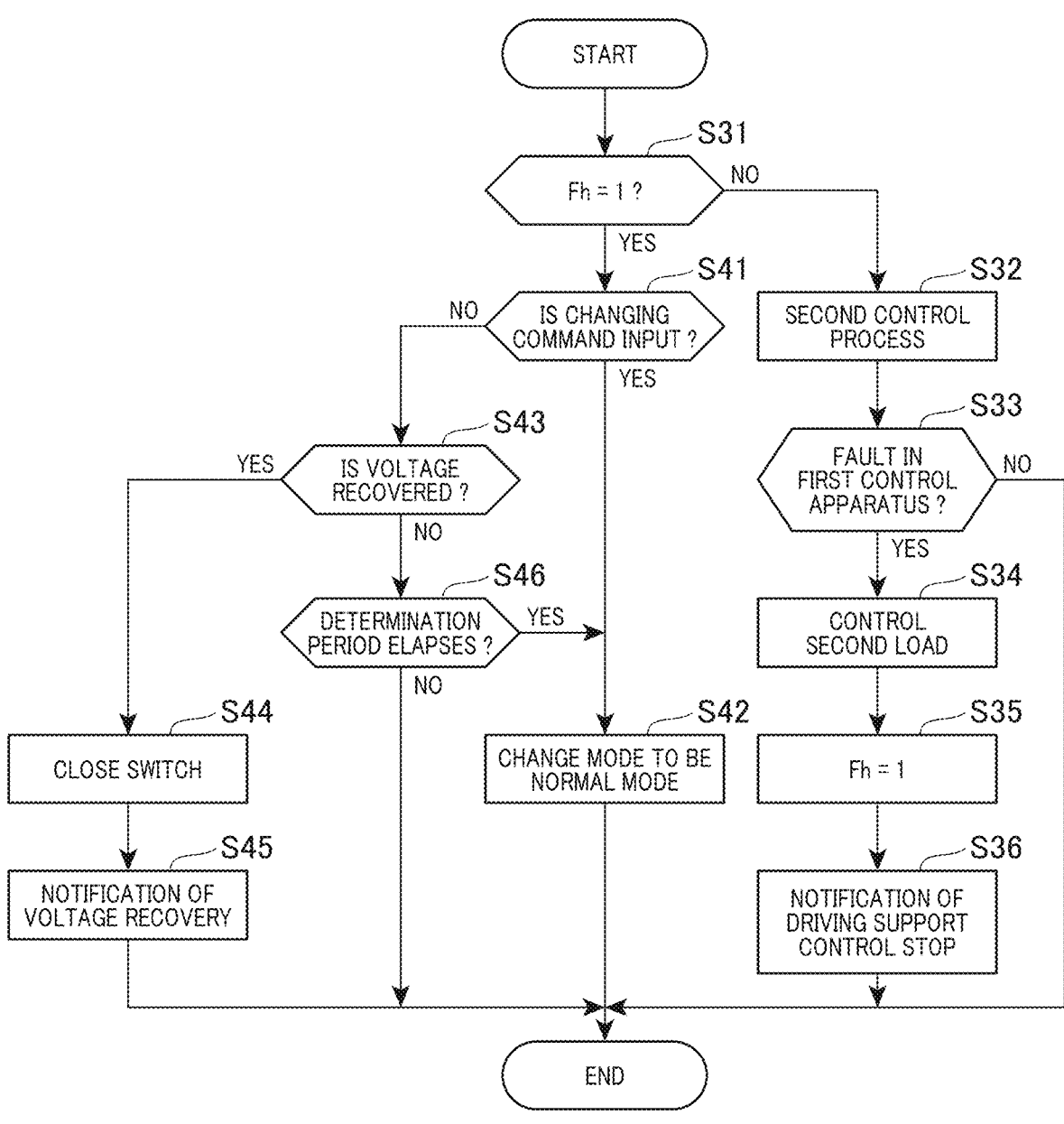
FIG. 3 is a flowchart showing a procedure of a second process.

FIG. 3 shows a flowchart of the second process performed by the second control apparatus 42. The second control apparatus 42 repeatedly performs the second process at a predetermined period when the IG switch 45 is closed. The predetermined period of the second process may be the same as the predetermined period of the first process or may be different from the predetermined period of the first process.

When starting the second process, at step S31, the process determines whether the abnormality flag Fh is 1. The abnormality flag Fh is set to be 0 when no abnormality occurs in the first control apparatus 41, and is set to be 1 when an abnormality occurs in the first control apparatus. When the abnormality flag Fh is 0, the process proceeds to step S32. When the abnormality flag Fh is 1, the process proceeds to step S41.

At step S32, the process performs the second control process. At subsequent step S33, the process determines whether an abnormality occurs in the first control apparatus 41. When abnormality has not occurred in the first control apparatus 41, the process determines that both the first and second loads 34 and 36 can be used. In this case, the process suspends the process without controlling the first and second loads 34 and 36 using the control command value calculated by the second control process.

On the other hand, when an abnormality has occurred in the first control apparatus 41, the process determines that the first load 34 cannot be used. In this case, at step S34, the process controls the second load 36 with the control command value calculated by the second control process. In other words, in the support mode, the driving support control by the first control apparatus 41 using the first and second loads 34 and 36 is changed to be a driving support control by the second control apparatus 42 using the second load 36 only. Note that since the second control apparatus 42 cannot perform a burden mitigation control such as the ACC, in the case where a burden mitigation process is underway when determined that an abnormality has occurred in the first control apparatus 41, the burden mitigation process is stopped.

At step S35, the process changes the abnormality flag Fh to be 1. At subsequent step S36, the process notifies the driver of stop of the driving support control via the notification unit 44, and temporarily terminates the process.

At step S41, the process determines whether the driver inputs the changing command to the input unit 46 for changing the travel mode to be the normal mode. When the driver inputs the changing command, the process changes the travel mode of the vehicle to be the normal mode from the support mode and suspends the process.

On the other hand, when the driver does not input the changing command to the input unit 46, the process determines, at step S43, whether the voltage is recovered from a voltage drop in the path LA1 in the first system using the voltage sensor 28. In the first system ES1, when a ground fault occurs at least one of the plurality of loads included in the first load 34 and the general load 30, a voltage drop occurs in the path LA1 in the first system. Thereafter, when excessive current flows to the load at which the ground fault occurs from the power source apparatus 10 and causes a blown of the fuse FA, the first voltage V1 increases to exceed a threshold voltage Vth and the voltage is recovered in the path LA1 in the first system.

In the case where the voltage recovers in the path LA1 in the first system, the process resumes a closed state of the inter-path switch SW at step S44. At subsequent step S45, the process notifies the driver of the voltage-recovery via the notification unit 44 and suspends the process. According to the present embodiment, the process at step S43 corresponds to a determination unit and the process at step S44 corresponds to a switch control unit.

Also, in the path LA in the first system, when a ground fault occurs in the converter 12 included in the power source apparatus 10, voltage-recovery does not occur in the path LA1 in the first system. When the voltage-recovery does not occur in the path LA1 in the first system, the process determines, at step S46, whether a determination period has elapsed since the communication was made to be impossible with the first control apparatus 41. The determination period is set to be shorter than a period where the vehicle is able to travel in the support mode with only the second storage battery 16, by a predetermined period.

When the determination period has elapsed, the process proceeds to step S42. That is, even without a response from the driver responding to the notification, the process changes the travel mode of the vehicle to be the normal mode from the support mode. In this case, the second control apparatus 42 causes the vehicle to move to a safety place in the support mode and then causes the vehicle to stop. Thereafter, the process changes the travel mode of the vehicle to be normal mode from the support mode. On the other hand, when the determination period has elapsed, the process suspends the process.

Figure 4:
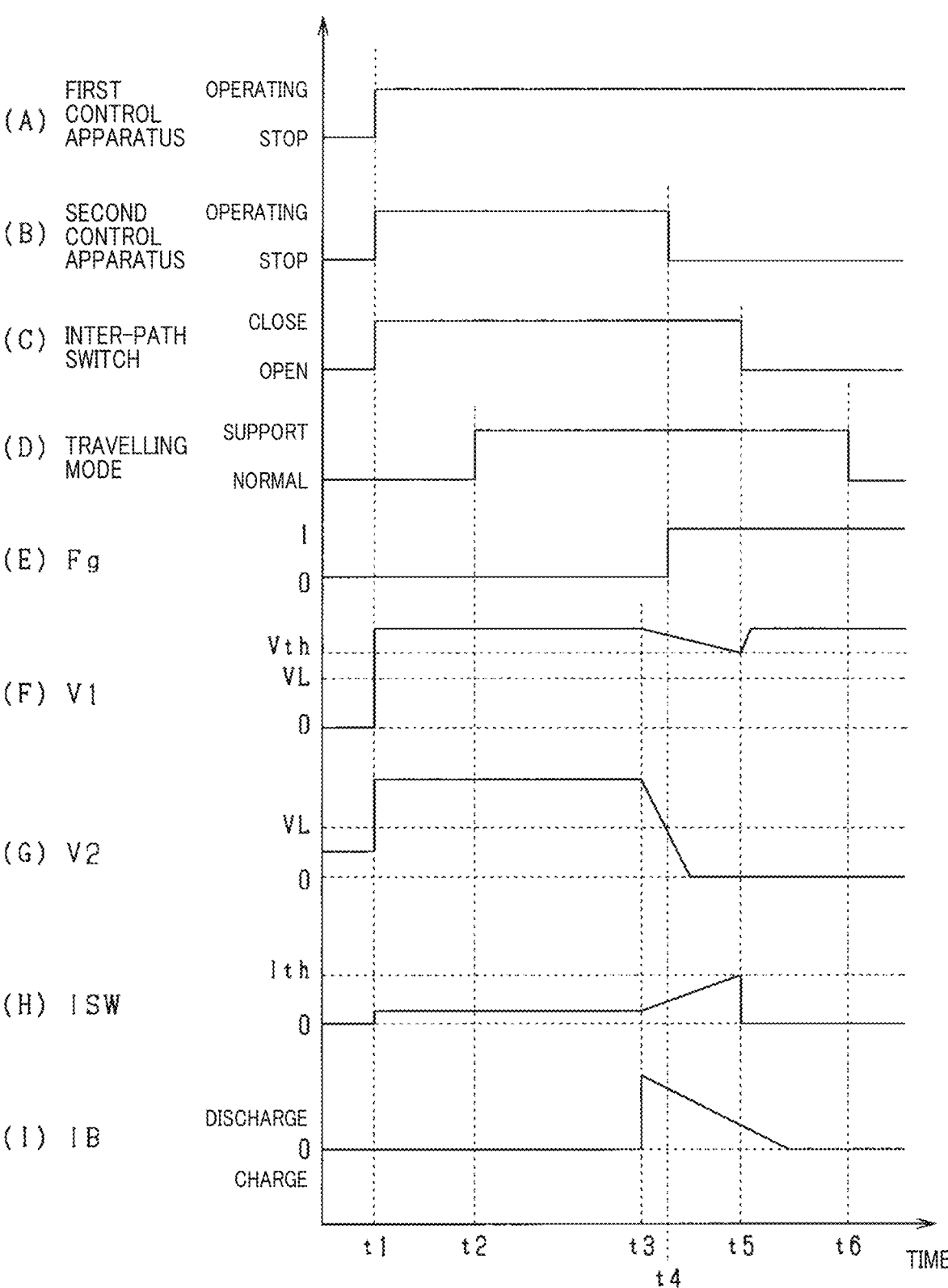
FIG. 4 is a timing diagram corresponding to items (A) to (I) when a ground-fault occurs in a second system during a driving support process.

FIG. 4 shows a change in the first voltage V1 of the path LA1 in the first system and the second voltage V2 of the second system when a ground fault occurs in the second system ES2 during the driving support. The first voltage V1 refers to a voltage at the connection point PA between the path LA1 in the first system and the connection path LB and equals to a voltage value detected by the voltage sensor 28. The second voltage V2 refers to a voltage at the connection point PB between the path LA2 in the second system and the connection path LB.

In FIG. 4, item (A) shows a change in an operation state of the first control apparatus 41, item (B) shows a change in an operation state of the second control apparatus 42, item (C) shows a change in an open-close state of the inter-path switch SW, item (D) shows a change in the travel mode of the vehicle and item (E) shows a change in the abnormality flag Fg.

Further, item (F) shows a change in the first voltage V1 of the path LA1 in the first system, item (G) shows a change in the second voltage V2 of the path LA2 in the second system, item (H) shows a change in the switch current ISW flowing through the inter-path switch SW, item (I) shows a change in the battery current IB as a charge-discharge current of the second storage battery 16. For the switch current ISW, the current value is the same as that detected by the current sensor 29 such that a direction of the current flowing towards the path LA2 in the second system 2 from the path LA1 in the first system is defined as positive.

As shown in FIG. 4, in an open period of the IG switch 45 till time t1, that is an inactive state of the control system 100, the inter-path switch SW is opened and the first control apparatus 41 and the second control apparatus 42 are in an operation stopped state.

When the IG switch 45 is closed at time t1, the ECU 40 closes the inter-path switch SW and causes the converter 12 to be in an operation state. Thus, the first voltage V1 and the second voltage V2 increase exceeding the operation lower limit voltage VL, and state of the first control apparatus 41 and the second control apparatus 42 become operation state after executing an initialize process for the activation. Thereafter at time t2, the driver changes the travel mode of the vehicle to be the support mode from the normal mode.

When the vehicle is travelling in the support mode, the first control apparatus 41 performs the first control process and the second control apparatus 42 performs the second control process in parallel to the first control process. Then, the first control apparatus 41 controls the second loads 34 and 36 using the control command value calculated by the first control process.

In the case where a ground fault occurs in either one of the system ES1 and the system ES2, the first voltage V1 becomes lower than the threshold voltage Vth, and the inter-path switch SW is opened by the switch operation unit 22. In FIG. 4, a ground fault occurs in the second system ES2 at time t3. With this, the second voltage V2 decreases and the battery current IB increases. At time t4, the second voltage decreases to the operation lower limit voltage VL, and then the second control apparatus 42 becomes the operation stopped state. As a result, when a communication fault occurs between the first control apparatus 41 and the second control apparatus 42, and when the first control apparatus 43 determines that a ground fault occurs in the second system ES2, the abnormality flag Fg is set to be 1 and the driver is notified that the driving support control will be stopped.

Also, the switch current ISW increases and the first voltage V1 decreases. According to the present embodiment, since the diode 23 is disposed on the connection path LB, the switch current ISW is prevented from increasing and the first voltage V1 is prevented from decreasing. As a result, a lowering speed of the first voltage V1 is lower than the lowering speed of the second voltage V2, and the first voltage V1 is prevented from being lowered below the operation lower limit voltage VL.

Thus, at time t4, the travel mode is changed to the driving support control using the first and second loads 34 and 36 from the driving support control using only the first load 34. The first control apparatus 41 performs the driving support control from a time before time t4. Hence, even when the driving support control is changed as described above, the driving support control can be prevented from being influenced by the change.

When the first voltage V1 decreases and reaches the threshold voltage Vth at time t5, the switch operation unit 22 opens the inter-path switch SW. Thereafter, at time t6, the driver changes the travel mode of the vehicle to be the normal mode from the support mode.

Figure 5:
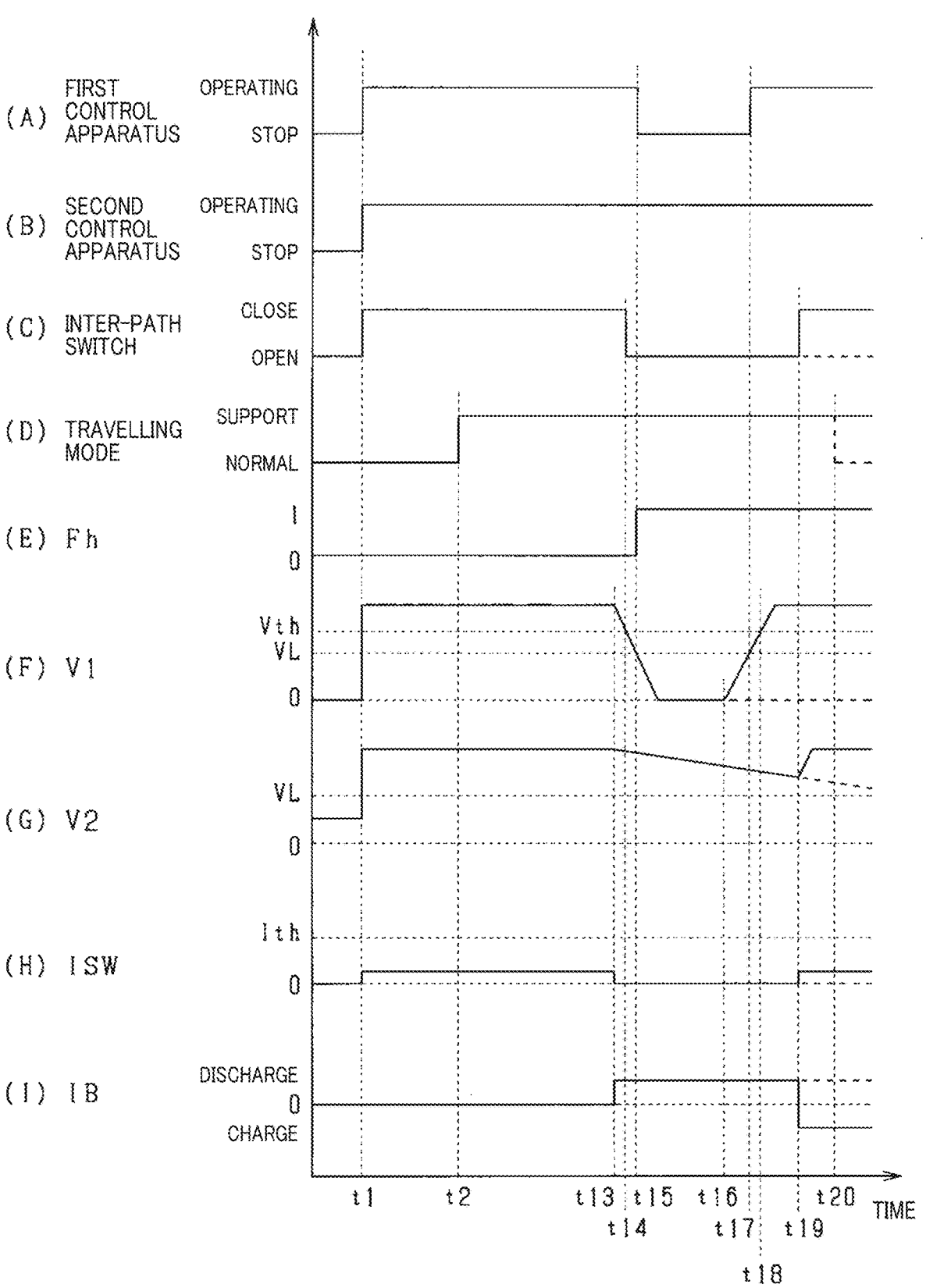
FIG. 5 is a timing diagram corresponding to items (A) to (H) when a ground-fault occurs in a first system during a driving support process.

FIG. 5 shows a change in the first voltage V1 and the second voltage V2 in the case where a ground fault occurs in the first system ES1 during the driving support. Note that items (A) to (I) in FIG. 5 are the same as items (A) to (I) shown in FIG. 4 except that item (E) shows the abnormality flag Fg. Moreover, since the changes of items until time t2 shown in FIG. 2 are the same as those shown in FIG. 4, the explanation thereof will be omitted.

In FIG. 5, a ground fault occurs in the first system ES1 at time t13. Thus, when the first voltage V1 decreases and reaches the threshold voltage Vth at time t14, the switch operation unit 22 opens the inter-path switch SW. Thereafter, at time t15, when the first voltage V1 decreases and reaches the operation lower limit voltage VL, the state of the first control apparatus 41 becomes an operation stop state. As a result, a communication fault occurs between the first control apparatus 41 and the second control apparatus 42, and the second control apparatus 42 determines that a ground fault occurs in the first system ES1, the abnormality flag Fh is set to be 1 and the driver is notified that the driving support control will be stopped.

Further, the second storage battery 16 starts to discharge and the second voltage V2 decreases. According to the present embodiment, since the diode 23 is disposed on the connection path LB, the switch current ISW is prevented from flowing towards the path LA1 in the first system from the path LA2 in the second system. As a result, a voltage of the second storage battery 16 is gradually lowered corresponding to a power consumption in the second system, such that a case where the first voltage V1 becomes lower than the operation lower limit voltage VL and at the substantially same time, the second voltage becomes lower than the operation lower limit voltage VL can be avoided.

Thus, at time t15, the control is changed to the driving support control by the second control apparatus 42 from the driving support control by the first control apparatus 41. The second control apparatus 42 performs the driving support control from a time before time t14, and since a preparation process for performing the driving support control is already performed, even when the driving support control is changed as described above, the driving support control can be prevented from being influenced by the change.

FIG. 5 illustrates a change in the respective values when a ground fault occurs in the first brake apparatus 51A of the first system ES1 with a solid line, and a change in the respective values when a ground fault occurs in the converter 12 of the first system ES1 with a solid line.

As shown in FIG. 5 with a solid line, when a ground fault occurs in the first brake apparatus 51A and the fuse FA connected to the first brake apparatus 51A is blown, the first voltage V1 increases. Thereafter, at time t17, when the first voltage V1 increases to reach the operation lower limit voltage VL, the first control apparatus 41 resumes an operation state.

At time t18, when the first voltage V1 increases to reach the threshold voltage Vth, the second control apparatus 42 determines that voltage is recovered at time t19, and the inter-path switch SW is returned to the closed state. Thus, the second voltage V2 increases and the switch current ISW flows to allow the second storage battery to be supplied with power. Also, the driver is notified that the voltage is recovered. With an example shown by a solid line in FIG. 5, the driver recognizes, in accordance with the above notification, that the vehicle can continue to travel with the support mode and the travel mode is maintained at the support mode.

As shown in FIG. 5 with a dotted line, in the case where a ground fault occurs in the converter 12, even when the fuse FA connected to the converter 12 is blown at time t16, voltage is not recovered. Since the driver does not receive the above notification, the driver recognizes that it is impossible to continue to travel with the support mode and inputs a changing command for changing the travel mode to be the normal mode at time t20 before the determination period elapses.

According to the above-described embodiments, the following effects and advantages can be obtained.

The supervisory unit 21 supervises a voltage drop in the path LA1 in the first system in a state where the inter-path SW is closed, and the switch operation unit 22 opens the inter-path switch SW when the supervisory unit 21 determines that a voltage drop occurs in the path LA1 in the first system during the driving support. In this case, even when a voltage drop occurs in the path LA2 in the second system due to a ground fault in the path LA2 in the second system, because of the diode 23, a large amount of current is prevented from flowing through the path LA2 in the second system in a period from when the ground fault occurs in the path LA2 in the second system to when the inter-path switch SW is opened, and a voltage drop in the path LA1 in the first system is avoided. Accordingly, the inter-path switch SW can be opened before a power fault occurs in the first system ES1 caused by a voltage drop in the path LA1 in the first system, thereby preventing control of the specific load 32 including the driving support control from being disturbed.

On the other hand, when a ground fault occurs in the path LA1 in the first system, a voltage drop occurs in the path LA1 in the first system. However, with the diode 23, a voltage drop in the path LA2 in the second system can be avoided. Thus, control of the specific load 32 can be prevented from being disturbed.

In particular, according to the first control apparatus 41 and the second control apparatus 42, even when a power-supply is instantaneously stopped, an initialization process is required to be performed for activation when being recovered, and control of the specific load 32 is inactivated during a period where the initialization process is performed. According to the present embodiment, since the diode 23 is disposed on the connection path LB, even when a ground fault occurs in any one of paths LA1 and LA2 in the systems, the power supply to the first control apparatus 41 and the second control apparatus 42 is prevented from being stopped and a control of the specific load 32 can be prevented from being disturbed.

In the control of the specific load 32, the first control apparatus 41 performs a first control process and the respective loads that constitute the driving support apparatus 38 are controlled with the control command value of the first control process. In parallel to this control, the second control apparatus 42 performs a second control process. Thus, even when an operation of the first control apparatus 41 is stopped due to a voltage drop in the first system ES1, control can be immediately transferred to the second control apparatus 42. In other words, the first control apparatus 41 and the second control apparatus 42 perform controls of the driving support mutually in parallel. Hence, when the power failure occurs in the first control apparatus 41, without waiting a completion for the initialization process for activation in the second control apparatus 42, control of the specific load 32 can be performed using the control command value calculated by the second control apparatus 42. Thus, control of the specific load 32 can be preferably prevented from being disturbed due to a voltage drop in the path LA1 in the first system and the path LA2 in the second system.

When an abnormality has not occurred in the first control apparatus 41, since the specific load 32 is controlled using the control command value calculated by the first control process, the second control process is not required to perform the calculation process or the calculation period which are the same as those in the first control process. According to the present embodiment, for the first control process and the second control process, the calculation processes are different with each other such that a processing load of the second control process is lower than that of the first control process. Thus, in the case where control of the second control apparatus 42 is performed in parallel to that of the first control apparatus 41, a controlling process performed by the second control apparatus 42 can be simplified.

In the first system ES1, a branch path LC is provided for each load included in the first load 34 and a fuse FA is provided in each branch path LC. Hence, in the case where a ground fault occurs at any one of loads in the path LA1 in the first system causing an excessive current to flow through the load, the power from/to the load is cutoff. Then, the first voltage V1 turns to increase in accompaniment with a blown of the fuse FA, whereby the inter-path switch SW is returned to be in the closed state. Thus, the power source can be switched to the power source apparatus 10 from the second storage battery 16 after the first voltage is resumed, and the power can be supplied to the second storage battery 16.

Modification Example of First Embodiment

The supervisory unit 21 may integrate, instead of the voltage determination circuit that determines whether the voltage detected by the voltage sensor 28 decreases below the predetermined threshold Vth, a current determination circuit that determines whether the current value detected by the current sensor 29 increases exceeding a current threshold Ith. As indicated by item (H) in FIG. 4, when a ground fault occurs in the second system ES2, the switch current ISW increases to reach the threshold current Ith at time t5. The supervisory unit 21 may determine that the switch current ISW increases to reach the threshold current Ith and the switch operation unit 22 may open the inter-path switch SW based on the determination result of the supervisory unit 21.

On the other hand, as indicated by item (H) in FIG. 5, when a ground fault occurs in the first system ES1, the switch current ISW does not increase up to the threshold current Ith. Hence, when the current determination circuit is not integrated to the supervisory unit 21, even when a ground fault occurs in the first system ES1, the inter-path switch SW is not opened.

Second Embodiment

Hereinafter, for the second embodiment, with reference to FIG. 6, configurations different from those in the first embodiment will mainly be described.

Figure 6:
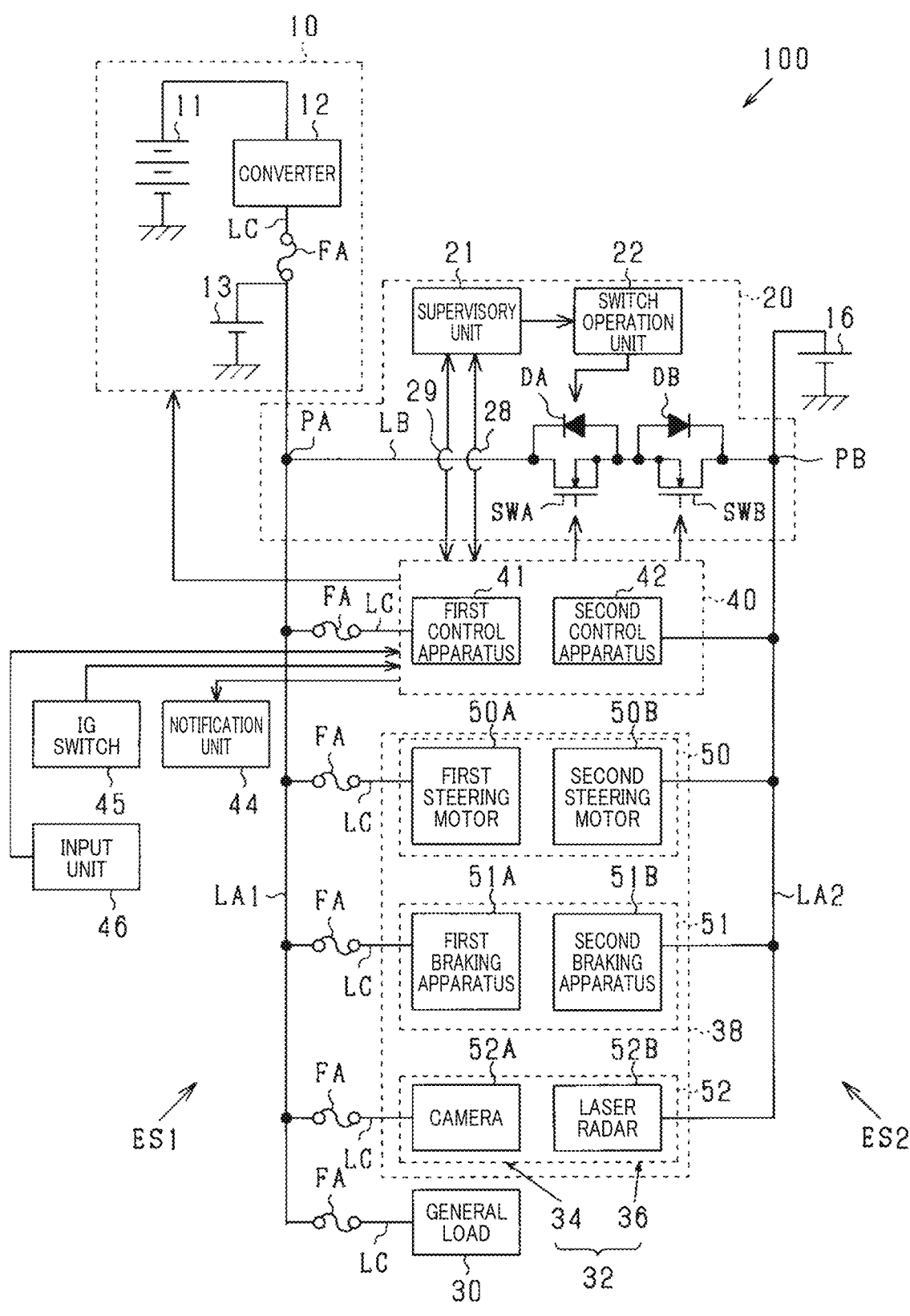
FIG. 6 is a block diagram showing an overall configuration of a control system according to a second embodiment.

For the inter-path switch SW and the diode 23 disposed on the connection path LB, as shown in FIG. 6, alternatively, they may be configured of a first switch SWA and a second switch SWB which are connected in series to the connection path LB. According to the present embodiment, as the first and second switches SWA and SWB, MOSFETs are utilized.

In the first switch SWA, a first diode DA is connected in parallel thereto as a parasitic diode. In the second switch SWB, a second diode DB is connected in parallel thereto as a parasitic diode. According to the present embodiment, the first diode DA and the second diode DB are connected in series such that forward directions thereof are mutually opposite. In more detail, the first and second switches SWA and SWB are connected as a back-to-back connection, that is, anodes of the first and second diodes DA and DB are mutually connected, the cathode of the first diode DA is in a first system ES1 side and the cathode of the second diode DB is in a second system ES2 side.

The ECU 40 changes open-close state of the first and second switches SWA and SWB. The ECU 40 closes the first switch SWA and opens the second switch SWB in a normal state where no ground fault occurs in both the first system ES1 and the second system ES2. Thus, the first switch SWA serves as the inter-path switch according to the first embodiment and the second diode DB serves as the diode 23 according to the first embodiment.

Further, the second control apparatus 42 closes at least the first switch SWA when the fuse FA connected to the converter 12 is blown in the case where a ground fault occurs in the converter 12 in the first system ES1. Thus, with power supplied from the second storage battery 16, the driving support control can be performed by the first control apparatus 41 and the second control apparatus 42.

Further, the ECU 40 intermittently closes the first and second switches SWA and SWB at every one hour during an opened state of the IG switch 45, that is, an inactive state of the control system 100. Thus, during the system inactive state, the first control apparatus 41 is activated at a predetermined period, and, for example, an equalization process can be performed for charge states of the respective battery cells that constitute the second storage battery 16.

According to the present embodiment, since the first and switches SWA and SWB are connected as a back to back connection in the connection path LB, one switch (first switch SWA) functions as an inter-path switch SW and a parasitic diode of the other switch (second switch SWB)

functions as the diode 23 as a current limiting element. With this configuration, even when a ground fault occurs in either the path LA1 in the first system or the path LA2 in the second system, control of the specific load 32 including the driving support control can be prevented from being disturbed. Further, assuming that the first switch SWA is caused to be opened due to the stop of the power source apparatus 10, thereafter, at least the second switch SWB is caused to be closed, whereby the second storage battery 16 is able to supply power to the first control apparatus 41.

Modification Example of Second Embodiment

The first and second switches SWA and SWB may be connected as a nose to nose connection instead of the back to back connection, that is, the cathodes of the first and second diodes DA and DB may be mutually connected.

Other Embodiments

The present disclosure is not limited to contents of the above-described embodiments. The present disclosure may be embodied in the following manner.

The respective loads 34 and 36 may be apparatuses as follows, for example.

A motor for travelling that applies a travelling power to the vehicle and its driving circuit may be utilized. In this case, the first load 34 and second load 36 may be a three-phase permanent magnet synchronous motor and a three-phase inverter, respectively.

An anti-lock brake apparatus that prevents wheels from being locked during braking may be utilized. In this case, each of the first and second loads 34 and 36 may be an ABS (i.e. anti-lock brake system) actuator capable of individually adjusting hydraulic pressure of brakes of wheels during braking.

The respective loads 34 and 36 are not necessarily configured using the same configuration, but the combination of the respective loads 34 and 36 may be accomplished by different types of equipment which serve as the same function. Further, the first and second loads 34 and 36 may not be different loads, buy may be the same load. That is, the first and second loads 34 and 36 may be same load to which the power is supplied through both of the path LA1 in the first system and the path LA2 in the second system.

The loads 34 and 36 may be constituents for achieving the same function. In this case, the first and second loads 34 and 36 may be an actuator of an electric power steering apparatus and an electric power steering ECU. In this case, the electric power steering ECU may be supplied with power through both of the path LA1 in the first system and the path LA2 in the second system.

A voltage generation unit of the first power source is not limited to a converter but may be an alternator. The first power source may not include the voltage generation part, but may include the first storage battery 13 only for example.

According to the above-described embodiments, it is exemplified that the supervisory unit and the switch control unit are each configured of a hardware circuit integrating various circuits. However, it is not limited thereto. For example, the supervisory unit and the switch control unit may be configured of a microcomputer composed of CPU, ROM, RAM, flash memory and the like.

According to the above-described embodiments, it is exemplified that the first control apparatus 41 controls, in an normal operation of the driving support process, the first and second loads 34 and 36 using only the control command value calculated by the first control process. However, it is not limited thereto. For example, the first control apparatus 41 may control the first load 34 with the control command value calculated by the first control process, and the second control apparatus 42 may control the second load 36 with the control command value calculated by the second control process.

According to the above-described embodiments, it is exemplified that calculation processes of the second control process performed by the second control apparatus 42 and the first control process performed by the first control apparatus 41 are different from each other. However, it is not limited thereto. The calculation periods may be different between the first control process and the second control process, and thus making the processing load of the second control process smaller than the processing load of the first control process.

According to the present embodiments, it is exemplified that the control system 100 is applied to a vehicle capable of travelling with a manual driving and an automatic driving. However, this is not limited thereto. As long as the control system 100 can be applied to vehicles capable of travelling only with an automatic driving such as a complete automatic driving vehicle, the control system 100 may be applied to a vehicle capable of travelling only by manual driving.

According to the above-described embodiments, it is exemplified that the second power source is a lithium-ion storage battery. However, it is not limited thereto. The second power source may be configured as an electrical double-layered capacity as long as other type of storage batteries can be utilized.

Hereinafter, distinctive configurations obtained from the above-described embodiments will be described.

Configuration 1

A power source supervisory apparatus (20) adapted for a control system (100) provided with a first control apparatus (41) and a second control apparatus (42) capable of controlling an electrical load (32), supplying power to the first control apparatus from a first power source (10) via a first path (LA) and supplying power to the second control apparatus from a second power source (16) via a second path (LA2), the power source supervisory apparatus comprising:
    a connection path (LB) that connects between the first path and the second path;
    an inter-path switch (SW) provided on the connection path;
    a current limiting element (23) disposed to be in series to the inter-path switch on the connection path, enabling a conduction from a first path side to a second path side under a current limiting state and obstructing a conduction from the second path side to the first path side;
    a supervisory unit (21) that supervises a voltage drop on the first path in a state where the inter-switch is closed; and
    a switch operation unit (22) that opens the inter-path switch when the supervisory unit determines that a voltage drop occurs on the first path.

Configuration 2

The power source supervisory apparatus according to configuration 1,
    wherein a diode is provided as the current limiting element such that a forward direction thereof is a direction towards the second path side from the first path side.

Configuration 3

The power source supervisory apparatus according to configurations 1 or 2,
    Wherein a pair of semiconductor switches (SWA, SWB) are provided in series on the connection path in which directions of parasitic diodes are mutually opposite; one semiconductor switch (SWA) in the pair of semiconductor switches serves as the inter-path switch and the parasitic diode of the other semiconductor switch (SWB) serves as the current limiting element.

Configuration 4

A control system (100) comprising: the power source supervisory apparatus (20) recited in any one of configurations 1 to 3; the first control apparatus and the second control apparatus; and the first path and the second path, wherein the first control apparatus performs a first control process that calculates a control command value and the electrical load is controlled using the control command value calculated by the first control process; the second control apparatus performs, in parallel to the first control process, a second control process that calculates a control command value; and the electrical load is controlled using the control command value calculated by the second control apparatus when a fault occurs in the first control apparatus.

Configuration 5

The control system according to configuration 4, wherein at least either a calculation process or a calculation period differs between the first control process performed by the first control apparatus and the second control process performed by the second control apparatus; and a processing load of the second control process is smaller than a processing load of the first control process.

Configuration 6

The control system according to configuration 4 or 5, wherein a plurality of first path side loads (50A, 51A, 52A) connected to the first path as the electrical load are provided;
    the first path includes branch paths each connected to each of the first path side loads, and a fuse (FA) is provided on each branch path;
    the second control apparatus includes a determination unit that determines whether a voltage-recovery occurs from a voltage drop in the first path and a switch control unit that resumes a closed state of the inter-path switch, when determined that the voltage-recovery occurs.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Conclusion

The present disclosure is to provide a power source supervisory apparatus and a control system capable of preventing a driving operation of the vehicle from being disturbed when a ground fault occurs.

A first means to solve the above-described issues is adapted for a control system provided with a first control apparatus and a second control apparatus capable of controlling an electrical load, supplying power to the first control apparatus from a first power source via a first path and supplying power to the second control apparatus from a second power source via a second path. The first means includes: a connection path that connects between the first path and the second path; an inter-path switch provided on the connection path; a current limiting element disposed to be in series to the inter-path switch on the connection path, enabling a conduction from a first path side to a second path side under a current limiting state and obstructing a conduction from the second path side to the first path side; a supervisory unit that supervises a voltage drop on the first path in a state where the inter-switch is closed; and a switch operation unit that opens the inter-path switch when the supervisory unit determines that a voltage drop occurs on the first path.

According to a control system provided with a first control apparatus and a second control apparatus capable of controlling an electrical load, supplying power to the first control apparatus from a first power source via a first path and supplying power to the second control apparatus from a second power source via a second path, a redundant function can be applied as a control function of the electrical load, and also a redundant function of the power system can be applied while using a first power source as a main power source. Further, since the inter-path switch and the current limiting element are provided to be in series on the connection path that connects between the first path and the second path, power can be supplied to the second power source and the second control apparatus from the first power source.

Moreover, assuming that a ground fault occurs in the configuration in which the first path of the first power source side and the second path of the second power source side are connected by a connection path, a voltage drop occurs on both of the second path and the first path. Hence, due to the voltage drop on the first and second paths, control of the electrical load may be disturbed.

In this regard, the supervisory unit supervises the voltage drop on the first path in a state where the inter-path switch is closed, and the switch operation unit opens the inter-state switch when the supervisory unit determines that a voltage drop occurs on the first path. In this case, even when a voltage drop occurs on the second path due to a ground fault on the second path, with the current limiting element, a large amount of current is prevented from flowing through the inter-path switch in a period from when the ground fault occurs to when the inter-path switch is opened. Hence, a voltage drop on the first path can be suppressed. Accordingly, the inter-path switch can be opened before a power failure occurs in the first power source side due to a voltage drop on the first path and control of the electrical load can be prevented from being disturbed.

On the other hand, when a ground fault occurs on the first path, although a voltage drop occurs on the first path, the current limiting element prevents a voltage drop from occurring on the second path. Thus, control of the electrical load can be prevented from being disturbed.

As a second means, a diode is provided as the current limiting element such that a forward direction thereof is a direction towards the second path side from the first path side.

According to the above-described configuration, a diode as a current limiting element is provided on a connection path such that a forward direction thereof is a direction towards the second path side from the first path side. In this case, with the current limiting function of the diode, conduction from the first path side to the second path side is enabled and conduction from the second path side to the first path side is disabled in a state of current limiting. Thus, even when a ground fault occurs on either the first path or the second path, a control of the electrical load can be prevented from being disturbed.

As a third means, a pair of semiconductor switches are provided to be in series on the connection path in which directions of parasitic diodes are mutually opposite, one semiconductor switch in the pair of semiconductor switches serves as the inter-path switch and the parasitic diode of the other semiconductor switch serves as the current limiting element.

In the connection path, with a configuration in which a pair of semiconductor switches are connected as a back-to-back or nose-to-nose connection, one semiconductor switch in the pair of semiconductor switch functions as an inter-path switch, and a parasitic diode of the other semiconductor switch functions as a current limiting element. Thus, even when a ground fault occurs either on the first path or the second path, a control of the electrical load can be prevented from being disturbed. Also, assuming that either one semiconductor switch is closed and the other semiconductor switch is opened, even when one semiconductor switch is opened due to a voltage drop on the first path, thereafter at least the other semiconductor switch is closed, whereby the power can be supplied to the first control apparatus from the second power source.

As a fourth means, a control system is provided including the above-described power source supervisory apparatus, the first control apparatus and the second control apparatus; and the first path and the second path, in which the first control apparatus performs a first control process that calculates a control command value and the electrical load is controlled using the control command value calculated by the first control process; the second control apparatus performs, in parallel to the first control process, the second control process that calculates a control command value; and the electrical load is controlled using the control command value calculated by the second control apparatus when a fault occurs in the first control apparatus.

In control of the electrical load, the first control apparatus performs a first control process that calculates a control command value, with the control command value calculated by the first control process, the electrical load is controlled and in parallel to this control, the second control apparatus performs the second control process that calculates the control command value. Thus, even when an operation of the first control apparatus is stopped due to a voltage drop in the first power source side, the second control apparatus is able to immediately take over control. That is, the first control apparatus and the second control apparatus perform respective control processes mutually in parallel, and when a power failure occurs in the first control apparatus, the electrical load can be immediately controlled with the control command value calculated by the second control apparatus without waiting for a completion of an initialization process for activating in the second control apparatus. Thus, even when a voltage drop occurs on the first path or the second path, a control of the electrical load can be prevented from being disturbed.

As a fifth means, at least either a calculation process or a calculation period differs between the first control process performed by the first control apparatus and the second control process performed by the second control apparatus;

and a processing load of the second control process is smaller than a processing load of the first control process.

In the case where a fault has not occurred in the first control apparatus, with a configuration in which the electrical load is controlled using the control command value calculated by the first control process, the second control process is not required to be performed with the calculation process or the calculation period which are the same as those of the first control process. According to the above-described configuration, at least either the calculation process or the calculation period is different between the first control process and the second control process, and the processing load of the second control process is smaller than the processing load of the first control process. Thus, in the case where control of the second control apparatus is performed in parallel to the control of the first control apparatus, a controlling process performed by the second control apparatus can be simplified.

As a sixth means, as the electrical load, a plurality of first path side loads connected to the first path are provided; the first path includes branch paths each connected to each of the first path side loads, and a fuse is provided on each branch path; the second control apparatus includes a determination unit that determines whether a voltage-recover occurs from a voltage drop in the first path and a switch control unit that resumes a closed state of the inter-path switch, when determined that the voltage-recover occurs.

According to a configuration in which branch paths are provided for a plurality of first path side loads, and a fuse is provided for each branch path, in the case where a ground fault occurs at any one of the loads in the first path causing an excessive current to flow through the load, the power from/to the load in the first path is cutoff. Then, when the fuse is cutoff causing the voltage of the first power source to increase, the closed state of the inter-path switch is resumed. Thus, after the voltage of the first power source is recovered, the power source can be appropriately changed to the first power source from the first power source.

What is claimed is:

1. A power source supervisory apparatus adapted for a control system provided with an electronic control unit ("ECU") comprising a first control apparatus and a second control apparatus that each comprise a processor and associated memory and are capable of controlling an electrical load, power being supplied to the first control apparatus from a first power source via a first path and power being supplied to the second control apparatus from a second power source via a second path, the power source supervisory apparatus comprising:
a connection path that connects between the first path and the second path;
an inter-path switch provided on the connection path;
a current limiting element in series with the inter-path switch on the connection path and enabling conduction from a first path side to a second path side under a current limiting state and obstructing conduction from the second path side to the first path side; and
a hardware circuit or microcomputer composed of a processor and memory and configured to
supervise occurrence of a voltage drop on the first path in a state where the inter-switch is closed; and
open the inter-path switch when the supervisory unit determines that a voltage drop occurs on the first path.

2. The power source supervisory apparatus according to claim 1, wherein a diode is provided as the current limiting element such that a forward direction thereof is a direction towards the second path side from the first path side.

3. The power source supervisory apparatus according to claim 1, wherein
a pair of semiconductor switches are provided in series on the connection path in which directions of parasitic diodes are mutually opposite; and
one semiconductor switch in the pair of semiconductor switches serves as the inter-path switch and the parasitic diode of the other semiconductor switch serves as the current limiting element.

4. A control system comprising:
an electronic control unit ("ECU") comprising a first control apparatus and a second control apparatus that each comprise a processor and associated memory and are capable of controlling an electrical load;
a first path though which power is supplied to the first control apparatus from a first power source;
a second path though which power is supplied to the second control apparatus from a second power source;
a power source supervisory apparatus comprising:
a connection path that connects between the first path and the second path;
an inter-path switch provided on the connection path;
a current limiting element disposed in series with the inter-path switch on the connection path and enabling conduction from a first path side to a second path side under a current limiting state and obstructing conduction from the second path side to the first path side; and
a hardware circuit or microcomputer composed of a processor and memory and configured to
supervise occurrence of a voltage drop on the first path in a state where the inter-switch is closed; and
open the inter-path switch when it is determined that a voltage drop occurs on the first path, wherein
the processor of the first control apparatus performs a first control process that calculates a first control command value and the electrical load is controlled using the first control command value calculated by the first control process;
the processor of the second control apparatus performs, in parallel to the first control process, the second control process that calculates a second control command value; and
the electrical load is controlled using the second control command value calculated by the second control apparatus when a fault occurs in the first control apparatus.

5. The control system according to claim 4, wherein
at least either a calculation process or a calculation period differs between the first control process performed by the processor of the first control apparatus and the second control process performed by the processor of the second control apparatus; and
a processing load of the second control process is smaller than a processing load of the first control process.

6. The control system according to claim 4, wherein
a plurality of first path side loads connected to the first path as the electrical load are provided;
the first path includes branch paths, each connected to one of the first path side loads, and a fuse is provided on each branch path; and
the processor of the second control apparatus determines whether a voltage-recovery occurs from a voltage drop in the first path and, when it is determined that the voltage-recovery occurs, causes a closed state of the inter-path switch to resume.

\* \* \* \* \*